Sept. 20, 1960 M. G. THASSY ET AL 2,953,362
RADIALLY ADJUSTABLE BORING HEAD AND MEANS FOR
INDICATING THE POSITION OF ADJUSTMENT
Filed Nov. 5, 1958 OF THE BORING ARMS
3 Sheets-Sheet 2

INVENTORS
Michael G. Thassy
Walter Silks
BY
Murray A. Gleeson
ATTORNEY

Sept. 20, 1960 M. G. THASSY ET AL 2,953,362
RADIALLY ADJUSTABLE BORING HEAD AND MEANS FOR
INDICATING THE POSITION OF ADJUSTMENT
OF THE BORING ARMS
Filed Nov. 5, 1958 3 Sheets-Sheet 3

INVENTORS
Michael G. Thassy
Walter Silks
BY
Murray A. Gleeson
ATTORNEY

United States Patent Office 2,953,362
Patented Sept. 20, 1960

2,953,362

RADIALLY ADJUSTABLE BORING HEAD AND MEANS FOR INDICATING THE POSITION OF ADJUSTMENT OF THE BORING ARMS

Michael G. Thassy, Chicago, and Walter Silks, Downers Grove, Ill., assignors to Goodman Manufacturing Company, Chicago, Ill., a corporation of Illinois Filed Nov. 5, 1958, Ser. No. 772,012

8 Claims. (Cl. 262—26)

This invention relates to improvements in boring heads for continuous mining machines and the like, and more particularly relates to an improved form of radially adjustable boring head.

A principal object of the invention is to provide an improved form of simple and efficient adjustable boring head structure in which the positions of adjustment of the cutter arms of the boring head are visually indicated to the operator of the machine at a position remote from the boring heads.

Another object of the invention is to provide a simple and improved radially adjustable boring head structure having radially adjustable boring arms, in which hunting of the boring arms is prevented during operation of the machine.

Still another object of the invention is to provide a novel form of boring head having a radially adjustable boring arm, with means indicating the position of adjustment of the boring arm at a position remote from the boring head, in which the drive means for the indicating means also serves to prevent hunting of the boring arm of the boring head, when the arm is once in adjustment.

A still further object of the invention is to provide a simple and efficient adjustable boring head having radially adjustable boring arms having adjusting means coaxial with the drive shaft for the boring head, in which the positions of adjustment of the boring arms of the boring head are visually indicated at a point remote from the boring head, and in which the indicating means is driven by relative movement between the adjusting means for the boring arms and the drive shaft for the boring head.

A still further and more detailed object of the invention is to provide a simple and efficient indicating means for indicating the positions of adjustment of the boring arms of a boring head, having a shaft concentric with the axis of rotation of the boring head, for adjustably moving the boring arms with respect to the head, in which the indicating means is driven by relative movement between the adjustment shaft and the boring head, and in which the drive to the indicating means includes drive means biased to prevent relative movement between the adjusting shaft in the boring head during operation of the boring head, and operated against its bias to release the adjustment shaft for rotation with respect to the boring head and to effect a drive to the indicating means operated by relative movement between the boring head and the adjustment shaft for the boring arms.

These and other objects of the invention will appear from time to time as the following specification proceeds and with reference to the accompany drawings wherein.

Figure 2:
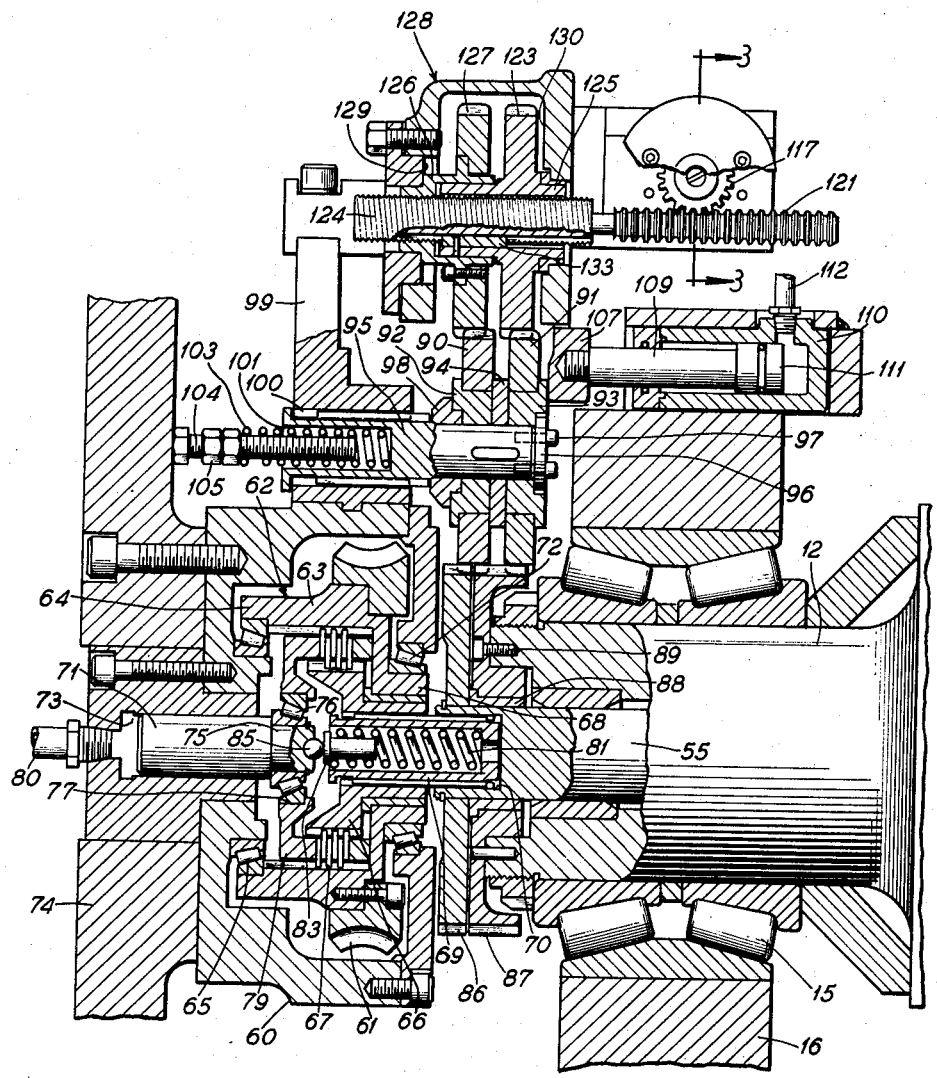
Figure 2 is an enlarged fragmentary longitudinal sectional view taken through the gear housing and rear end portion of the drive shaft of the boring head, in order to illustrate the drive to the indicating and adjusting mechanism.
Figure 3:
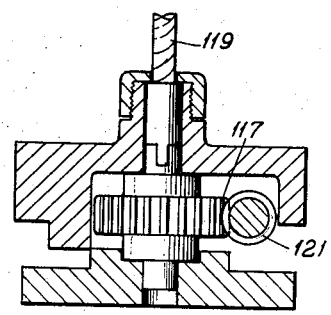
Figure 4:
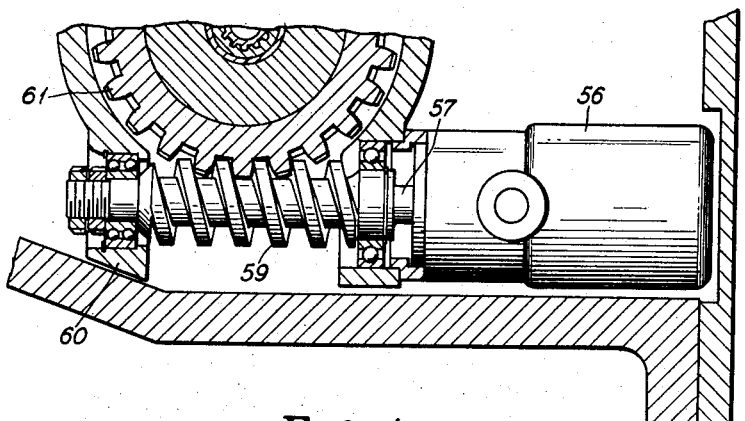

Figure 3 is a fragmentary sectional view taken substantially along line 3—3 of Figure 2, looking in the direction of the arrows, and showing certain details of the drive to the cutting diameter indicator; and Figure 4 is an enlarged detail fragmentary transverse sectional view taken through the drive gearing for driving the adjusting mechanism, in order to illustrate the motor and its drive to the adjusting mechanism.

Figure 1:
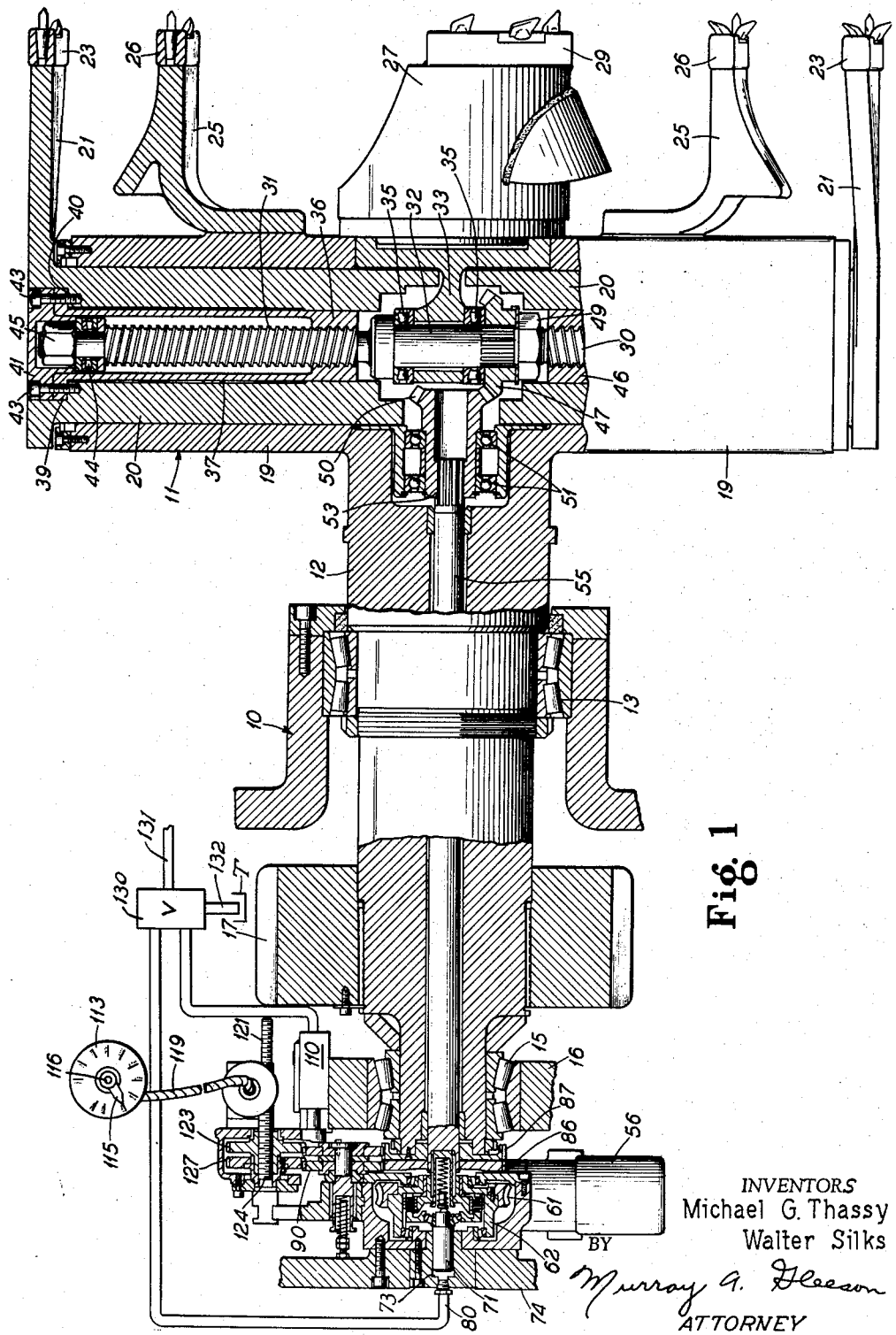
Figure 1 is a fragmentary partial longitudinal sectional view taken through the gear casing, drive shaft and boring head of a boring type mining machine, with certain parts broken away in order to illustrate the mechanism for adjusting and indicating the cutting diameter of the boring head.

In the embodiment of the invention illustrated in the drawings, I have shown in Figures 1 and 2 a fragment of a gear casing 10 enclosing the drive gearing for driving at least one boring head 11, and also forming a support and adjusting means for the boring head.

The gear casing 10 usually supports a plurality of boring heads and may be adjustably supported on the mobile main frame (not shown) of the continuous mining machine in a manner well known to those skilled in the art, so not herein shown or described in detail.

The boring head 11, as shown in Figure 1, includes a hollow shaft 12 extending beyond the forward end of the gear casing 10 and journalled in said gear casing on anti-friction thrust bearings 13. The rear end portion of the shaft 12 is journalled in the gear casing 10 on anti-friction thrust bearings 15 carried in a bearing support 16 mounted within said gear casing. A spur gear 17 is keyed or otherwise secured to the shaft 12 for rotatably driving said shaft through a reduction gear train (not shown) journalled within said gear casing and driven by a suitable motor (not shown), which may be remote from the gear casing.

The shaft 12 is shown as having two oppositely projecting hollow support arms 19 extending radially from the axis of said shaft. The support arms 19 each have a boring arm 20 mounted therein for telescopic movement with respect thereto. The boring arms 20 each have a cutter support 21 projecting forwardly therefrom having cutter bit carrying blocks 23 extending along the forward face thereof and positioned to cut arcuate kerfs in the coal face. Intermediate cutter supports 25 project forwardly of the support arms 19 inwardly of the cutter supports 21 and have cutter bit carrying blocks 26 extending along the forward faces thereof. A pilot cutter 27 extends forwardly of the shaft 12 and has annularly arranged cutter bit carrying blocks 29, projecting forwardly therefrom to cut an annular pilot kerf adjacent but spaced outwardly of the axis of rotation of the shaft 12.

The boring arms 20 and cutter supports 21 are radially adjusted by oppositely pitched lead screws 30 and 31, herein shown as being integrally formed with an intermediate bearing and splined drive section 32, journalled in a support 33 on spaced anti-friction bearings 35.

The lead screw 31 is threaded within an inner threaded end portion 36 of a sleeve 37, extending along the hollow interior portion of the boring arm 20 and forming a drive nut for adjustably moving said arm. The sleeve 37 has a flanged outer end portion 39 engaging a shouldered portion 40 of the boring arm 20 and retained to said boring arm, as by a cap 41 closing the outer end of the sleeve 37. The cap 41 is retained to the sleeve 37 and the boring arm 20 as by cap screws 43, threaded within the shouldered portion 40 of said boring arm. A thrust bearing 44 is shown as being mounted on the outer end portion of the lead screw 31, and as being retained thereto as by a nut 45 threaded on the end of said lead screw. The thrust bearing is provided to reduce friction between the lead screw and the cap 41, when the cutter arm 20 is in its inmost position of adjustment, as shown in Figure 1.

The lead screw 30 is also threaded within the inner end or nut portion of a sleeve 46, like the sleeve 36, and forming a nut travelling along said lead screw to effect vertical adjustment of its associated boring arm 20 and cutter support 21, upon rotation of said lead screw.

The drive to the lead screws 30 and 31 includes a bevel gear 47 splined to the splined portion of the bearing and drive section 32 of the lead screws 30 and 31, and retained thereto as by a retaining nut 49. The bevel gear 47 is meshed with and driven from a bevel gear 50, journalled within the forward end portion of the shaft 12, coaxial with the axis of rotation thereof, on spaced anti-friction bearings 51. The miter gear 50 has an internally splined hub 53, upon which the anti-friction bearings are mounted, and having splined engagement with the splined end of an adjustment shaft 55. The adjustment shaft 55 is journalled within the shaft 12, coaxial with the axis of rotation thereof and extends therealong and beyond the rear end thereof.

The shaft 55 is driven from a motor 56, mounted within the gear casing 10, and herein shown as being a fluid operated motor. The motor 56, as shown in Figure 4, has a motor shaft 57 driving a coaxial worm 59 journalled in a worm and worm gear housing 60. The worm 59 meshes with and drives a worm gear 61 journalled within the worm and worm gear housing 60.

The worm gear 61 is shown as forming the drive member for a clutch 62 and as being mounted on a housing 63 for the clutch. The housing 63 has an annular open rear end portion 64 journalled within the worm and worm gear housing 60 on an anti-friction thrust bearing 65. The housing 63 also has an opposite flanged or hub portion 68 journalled on a driven member 66 for the clutch. The drive from the driving member 63 to the driven member 66 is through friction disks 67, alternate of which disks are splined to the driving member 63 and the driven member 66. The hub portion 68 is also journalled within the worm and worm gear housing 60 on an anti-friction thrust bearing 72. The driven member 66 in turn is splined to an externally splined cup-like drive plug 69, splined to an internally splined hollow portion 70 of the adjustment shaft 55, for rotatably driving said shaft as the clutch disks 67 are engaged.

The clutch disks 67 are pressed into driving engagement with each other, to effect a drive from the worm gear 61 to the shaft 55 by operation of a hydraulically operated piston 71 in a cylinder 73, mounted in an end plate 74 for the gear casing 10. The piston 71 is herein shown as having a reduced diameter inner end portion 75 journalled within a shouldered open end portion 77 of a pressure or engaging member 79 for the clutch, on a thrust bearing 76. The pressure member 79 has engagement with the outer end disk 67 of the clutch disks to engage the clutch upon the admission of fluid under pressure into the cylinder 73 through an inlet line 80.

The pressure member 79 is biased into position to effect disengagement of the clutch by a spring 81 seated at one end in the inner end of the cup-like drive plug 69 and seated at its opposite end on a plunger 83, engaging a ball 85 on the inner end of the piston 71.

Referring now in particular to the means for preventing hunting of the cutter arms with respect to their supports when once in an adjusted position, and for indicating the positions of adjustment of the cutter arms at a point remote from the boring heads, a spur gear 86 is keyed or otherwise secured to the inner end of the adjustment shaft 55, and is rotatably driven therefrom. A spur gear 87 of the same pitch diameter as the pitch diameter of the spur gear 86 is journalled on the end of the adjustment shaft 55 on a bearing 88, and is shown as being secured to the inner end of the drive shaft 12, as by cap screws 89.

The spur gears 86 and 87 mesh with idler gears 90 and 91, rotatably mounted on bearing members 92 and 93 respectively, spaced apart by a spacer bearing 94. The bearing members 92 and 93 and the spacer bearing 94 are shown as being keyed to an axially movable shaft 95, and as being retained for axial movement with said shaft as by an end cap 96 recessed within the bearing member 93 and secured to the shaft 95 as by cap screws 97. The end cap 96 presses the bearing member 92 into engagement with a retainer 98 mounted on the shaft 95 and retained from axial movement with respect thereto.

The shaft 95 is mounted in a support 99 for axial movement with respect thereto, and is keyed to said support, as indicated by reference character 100, to retain the shaft 95 for rotation with respect to said support. The shaft 95 is shown as having a hollow interior outer end portion 101, having a compression spring 103 seated therein. The spring 103 encircles a threaded rod 104, extending inwardly from the inner side of the end plate 74 and abuts adjustment nuts 105 threaded on said rod and operative to preload the spring 103.

The spring 103 thus biases the shaft 95 inwardly of the support 99 and biases the idler 90 into mesh with the spur gears 86 and 87, to lock said spur gears to rotate together and thereby effect the rotation of the adjustment shaft 55 and the drive shaft 12 together. In this condition, the boring arms 20 are locked in adjusted relation with respect to the support arms 19.

A shifting means is provided, which is operable to move the shaft 95 against the bias of the spring 103, to mesh the idler gears 90 and 91 with the respective spur gears 86 and 87, and to accommodate relative movement between the adjustment shaft 55 and the drive shaft 12, to radially adjust the boring arms 20 into a desired radial position of adjustment. The shifter means includes a block 107 on the end of the piston rod 109, and engaging the inner end face of the bearing member 93. The piston rod 109 is slidably mounted in a cylinder 110 and slidably extends through the head end thereof. A piston 111 on the inner end of the piston rod 109 within the cylinder 110, is subjected to fluid under pressure through an inlet pressure line 112, to shift the idler gears 90 and 91 against the spring 103 into mesh with the respective spur gears 86 and 87, as fluid under pressure is admitted to the cylinder 73, to engage the clutch disks 67 and effect the drive of the shaft 55.

Fluid under pressure may be simultaneously admitted to the cylinders 73 and 110 through the respective pressure lines 80 and 112 under the control of a single valve 130, supplied with fluid under pressure through a pressure line 131 connected with a suitable source of fluid under pressure and connected to the pressure lines 80 and 112 to supply fluid under pressure thereto to operate the respective pistons 71 and 111 to engage the clutch disks 67 and release the shafts 55 and 12 to rotate relatively with respect to each other as the clutch disks 67 are engaged to effect a drive to the shaft 55, and to release fluid under pressure from the cylinders 73 and 110 through a return line 132 connected to tank, to accommodate the spring 101 to move the idler gear 90 into mesh with the spur gears 86 and 87, to lock said spur gears for rotation together, as the spring 81 disengages the clutch disks 67, to lock the boring arms 20 in position and to thereby prevent hunting, or further adjustable movement of the boring arms 20 when once adjusted to a selected cutting diameter.

Referring now to the indicating means, visually indicating the cutting diameters of the boring arms 20, a dial 113 is mounted remote from the boring heads 11, adjacent the operator of the machine. The dial 113 has indicia thereon indicating the various cutting diameters of the boring head throughout the range of adjustment of the boring arms 20, in accordance with the position of a pointer 115, rotatably mounted for movement along the face of said dial. The pointer 115 is shown as being mounted on the end of a pointer shaft 116, rotably driven from a gear 117 remote from said pointer, through a flexible shaft 119 driven from the gear 117.

The gear 117 is suitably journalled within the gear casing 10, while the flexible shaft 119 extends outwardly of the gear casing 10, to accommodate the positioning of the dial 113 and pointer 115 adjacent the operator's station.

The gear 117 is rotated by a rack 121, the faces of the teeth of which wrap completely around the rack in the form of concentric circles to accommodate rotation of the rack 121 with an indicator gear 123, meshing with the idler gear 91.

A threaded shaft 124 is shown as being formed integrally with the rack 121 and extends through a hub 125 of the indicator gear 123 and through a hub 126 of an indicator gear 127, meshing with the idler gear 90.

The hub 126 has threaded engagement with the threaded shaft 124 and extends over the hub 125 of the indicator gear 123, and accommodates relative rotation of the indicator gears 123 and 127 with respect to each other. The hubs 126 and 125 have interengagement with opposite inner walls 129 and 130 of a housing portion 128, to retain the indicator gears 127 and 123 from axial movement.

The indicator gear 123 is feather keyed to the threaded shaft 124, as indicated by reference character 133, and serves to rotate said shaft, while the indicator gear 127, threaded on the shaft 124, serves to effect axial movement of said shaft and translational movement of the rack 121, to rotatably drive the gear 117.

Thus, when the gears 123 and 127 rotate together at the same rates of speeds, as when the idler gear 90 is in mesh with the gears 86 and 87, the shaft 124 will be rotatably driven. Since the gears 123 and 127 rotate together there can be no axial movement of rack 121. When, however, the clutch disks 67 are engaged and the idler 90 is shifted to mesh with the gear 86, the idler 91 likewise being shifted but remaining in mesh with the gear 87, to accommodate relative movement of the shaft 55 with respect to the shaft 12, there will be relative rotational movement between the indicator gears 127 and 123. This will effect axial movement of the rack 121 in one direction or another, depending upon which of the indicator gears is moving faster in a given direction. The dial 113 is so calibrated, and the indicator gears 123 and 127 are so proportioned with respect to the drive gears 86 and 87, and the lead of the threads of the threaded shaft 124 is such that the rack 121 will drive the gear 117 and the indicator pointer 115 along the dial 113, to accurately indicate the cutting diameter of the boring arms 20 over the entire range of adjustment of said boring arms.

The operator of the machine may, therefore, readily determine the positions of adjustment of the boring arms 20 by a glance at the indicator disk 113 during the entire range of adjustment of the boring arms, and the instant the boring arms are in a desired position of adjustment, to cut at the required cutting diameter, the spring 101 will move the idler gear 90 into mesh with the gears 86 and 87, to lock the boring arms in adjustment by locking the adjustment shaft 55 for rotation with the shaft 12, and to thereby prevent hunting or further adjustable movement of the cutter arms in one direction or another.

While we have herein shown and described one form in which our invention may be embodied, it may readily be understood that various modifications and variations in the invention may be effected without departing from the spirit and scope of the novel concepts thereof, as defined by the claims appended hereto.

We claim as our invention:

1. In a rotary boring head, a hollow shaft, a boring arm projecting radially from said shaft and mounted on said shaft for radial adjustable movement with respect thereto, means for radially adjusting said boring arm including an adjustment shaft rotatably mounted within said hollow shaft for rotation therewith during operation of the boring head, and for relative rotational movement with respect thereto, to effect radial adjustment of said boring arm, means for driving said adjustment shaft relative to said hollow shaft comprising a clutch and means for engaging and disengaging said clutch, means in addition to said clutch for locking said boring arm in a fixed position of adjustment with respect to said shaft comprising means operated simultaneously with disengagement of said clutch for locking said adjustment shaft to rotate with said boring arm and indicating means operated by said locking means upon release of said locking means and engagement of said clutch for indicating the position of adjustment of said boring arm.

2. In a rotary boring head, a hollow shaft, at least one boring arm projecting radially from said shaft, means for radially adjusting said arm including an adjustment shaft rotatably mounted within said hollow shaft and a motion translating drive connection from said adjustment shaft to said boring arm for rectilinearly adjusting said arm, means for rotatably driving said adjustment shaft relative to said hollow shaft including a motor and a clutch connecting said motor to said adjustment shaft and fluid pressure operated means for operating said clutch, means operated upon release of said clutch for indicating the position of adjustment of said boring arm and locking said hollow shaft for rotation with said adjustment shaft comprising two coaxial spur gears, one being rotatable with said adjustment shaft and the other being rotatable with said hollow shaft, two coaxial axially movable idler gears, means biasing one of said idler gears to mesh with both of said spur gears to lock said spur gears for rotation together, and other means operated simultaneously with disengagement of said clutch for axially moving said idler gears to each mesh with only one of said spur gears to release said shafts for independent rotation, and indicating means indicating the position of adjustment of said boring arm operated by relative movement between said idler gears.

3. A rotary boring head comprising a hollow shaft having a plurality of boring arms projecting radially therefrom, means mounting at least one of said arms for radial adjustment to vary the cutting diameter of the boring head, means for radially adjusting at least one of said arms including an adjustment shaft rotatably mounted within said hollow shaft and a motion translating drive connection from said adjustment shaft to the adjustable boring arm, a motor, a clutch connecting said motor to said adjustment shaft and selectively operable to rotatably drive said adjustment shaft relative to said hollow shaft, means operable by relative rotation between said shafts for indicating the position of radial adjustment of said adjustable arm comprising a dial, a pointer movable along said dial, and means operable to position said pointer along said dial in accordance with the position of radial adjustment of said adjustable arm comprising an axially movable drive member rotatably driven by said hollow shaft and axially driven by said adjustment shaft upon relative rotational movement of said shafts with respect to each other.

4. A rotary boring head in accordance with claim 3 in which the axially movable drive member comprises a rack and in which the drive to said rack includes an indicator gear on said rack for rotatably driving said rack, a second indicator gear on said rack for translationally moving said rack as the speed of said second idler gear changes with respect to the speed of said first mentioned gear, a drive connection from said hollow shaft to said first mentioned gear and a drive connection from said adjustment shaft to said second mentioned gear.

5. In a rotary boring head, a hollow shaft, a support arm projecting radially from said shaft, a boring arm mounted in said support arm for radial adjustment with respect to the axis of rotation of said shaft, means for radially adjusting said boring arm including an adjustment shaft rotatably mounted within said hollow shaft, a motion translating drive connection from the forward end of said adjustment shaft to said boring arm, means for rotating said adjustment shaft relative to said hollow shaft including a motor and a selectively engageable clutch connecting said motor to said adjustment shaft, and means indicating the position of adjustment of said boring arm comprising a dial, a pointer mounted for movement about said dial, two gears of the same pitch diameters, one being mounted on and driven from said hollow shaft and the other being mounted on and driven from said adjustment shaft, two coaxial idler gears meshing with said gears, means mounting said idler gears for movement along the axes thereof and biasing one of said idler gears to mesh with each of said first mentioned gears to lock said first mentioned gears to rotate together, means operable upon engagement of said clutch for shifting said idler gears to individually mesh with said spur gears, and drive means driven by said idler gears and operated by relative rotation of said idler gears with respect to each other for moving said pointer along said dial.

6. A boring head in accordance with claim 5, in which the drive means operated by relative movement between the hollow shaft and adjustment shaft includes a shaft rotatable about an axis parallel to the axis of rotation of said idler gears, two indicator gears mounted on said shaft, each meshing with one of said idler gears, one of said indicator gears having threaded engagement with said shaft and the other of said indicator gears having rotatable driving connection with said shaft whereby rotational and translational movement of said shaft is effected by relative movement between said gears, and a motion translating drive connection from said shaft to said pointer translating the rectilinear movement of said shaft to rotational movement.

7. A rotary boring head in accordance with claim 5 wherein a shifter member is provided to shift said idler gears to individually mesh with said spur gears on said adjustment shaft and said hollow shaft, and wherein an operative connection is provided between said shifter member and said clutch to effect shifting of said idler gears to individually mesh with said spur gears upon engagement of said clutch.

8. A rotary boring head comprising a hollow shaft having a plurality of boring arms projecting radially therefrom, means mounting at least one of said boring arms for radial adjustable movement with respect to the axis of said shaft, means for rotatably driving said shaft and boring head, means for radially adjusting at least one of said boring arms including an adjustment shaft rotatably mounted within said hollow shaft and a motion translating drive connection from said adjustment shaft to the adjustable of said boring arms, an indicator indicating the position of radial adjustment of said boring arm, and means operated by relative movement between said shafts for moving said indicator to indicate the position of radial adjustment of the adjustable of said boring arms comprising an axially movable drive member, an indicator gear on said drive member for rotatably driving said drive member, a second indicator gear on said drive member for translationally moving said drive member as the speed of said second gear changes with respect to the speed of said first mentioned gear, and individual drive connections from said hollow shaft and said adjustment shaft to said indicator gears.

References Cited in the file of this patent
UNITED STATES PATENTS

| | | |
|---|---|---|
| 847,801 | Moffitt | Mar. 19, 1907 |
| 2,853,890 | Kelbel | Sept. 30, 1918 |
| 2,879,049 | Poundstone | Mar. 24, 1959 |